Jan. 26, 1965  J. R. HORNADAY, JR., ET AL  3,167,638
SURFACE COOKING UNIT

Filed March 22, 1961 2 Sheets-Sheet 1

INVENTORS
James R. Hornaday, Jr.
Edwin J. Miller
BY Charles W. Vigor

Frederick M. Ritchie
*Their Attorney*

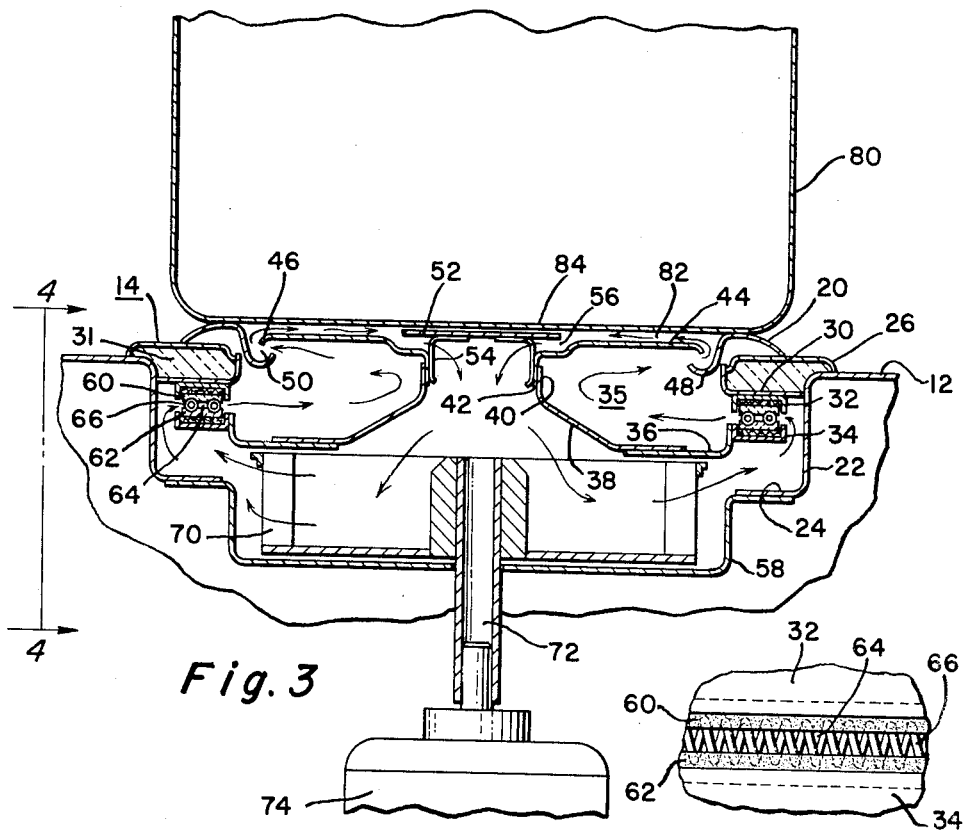
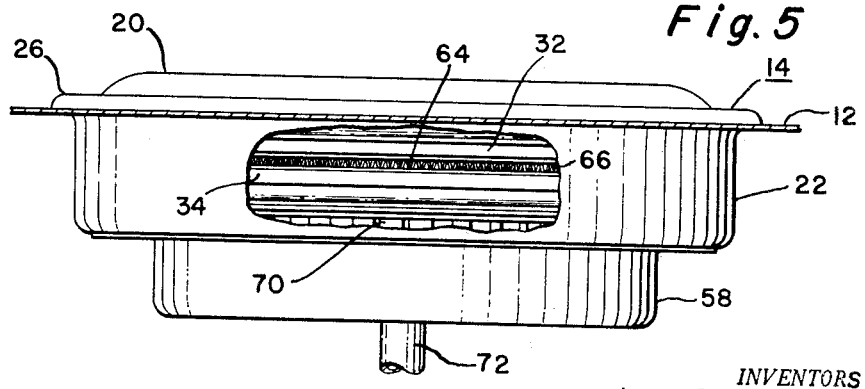

United States Patent Office 3,167,638
Patented Jan. 26, 1965

3,167,638
SURFACE COOKING UNIT
James R. Hornaday, Jr., Birmingham, Edwin J. Miller, Detroit, and Charles W. Vigor, East Detroit, Mich., assignors to General Motors Corporation, Detroit, Mich., a corporation of Delaware
Filed Mar. 22, 1961, Ser. No. 97,572
8 Claims. (Cl. 219—368)

This invention relates to a domestic appliance and more particularly to an improved electric range surface unit operating on the principle of convection heat transfer.

For some years the electric range art has used an electric surface heating or cooking unit which was formed as a sheathed tubular element coiled into a suitable spiral configuration and disposed on the top of the range for supporting a pan or utensil. The design and efficiency of such units have remained comparatively stable in recent years. But one problem with coiled heating units—their point contact with the bottom of the pan—causes a certain amount of uneven heat distribution between the heating element and the pan. In addition, prior art electrical heating elements have the added disadvantage of retaining a substantial amount of heat when the element is deenergized. Thus, cooking continues after the desired point of termination. A still further disadvantage in the prior art coiled heating element is found in the fact that, under unloaded conditions, the heating element overheats, thereby increasing the tendency of the heating element to burn out. These disadvantages are all overcome in the novel air convection range surface heater of this invention.

Accordingly, it is an object of this invention to provide an electric range with surface units which operate on the principle of convection heat transfer.

Another object of this invention is the provision of a convection heat flow electric range surface unit which has an improved cold start performance and steady state efficinecy as compared to a tubular sheathed heating element equipped with a flash heating switch.

It is a further object of this invention to provide an air convection range surface heater which is regenerative during a cooking operation and nonregenerative when the surface heater is unloaded.

A still further object of this invention is the provision of an improved electric range surface cooking unit which provides for more uniform heat distribution across the bottom of a pan during cooking and more rapid cessation of heat transfer when the surface unit is deenergized.

Other advantages found in the improved range surface heater of this invention are good performance with cast iron and ceramic cooking vessels; higher watt density or heat fluxes possible than with tubular sheathed heaters; no combustion products and little waste heat exhausting into the kitchen; no condensate on the bottom of a cooking vessel; and no overheating of side walls or handles of the cooking vessel.

Specifically, an object of this invention is the provision of a surface cooking unit for an electric range which provides a heat source remote from the cooking area and an air impelling means for recirculating air from the cooking area across the source of heat and returning the heated air to the cooking area.

Further objects and advantages of the present invention will be apparent from the following description, reference being had to the accompanying drawing wherein preferred embodiments of the present invention are clearly shown.

In the drawings:

FIGURE 3 is a fragmentary sectional view taken along line 2—2 in FIGURE 1 to show the surface heater supporting a cooking utensil or in a loaded condition;

FIGURE 4 is a fragmentary elevational view with parts broken away taken along line 4 in FIGURE 2; and FIGURE 5 is a fragmentary enlargement of the heating coil assembly.

Figure 1:
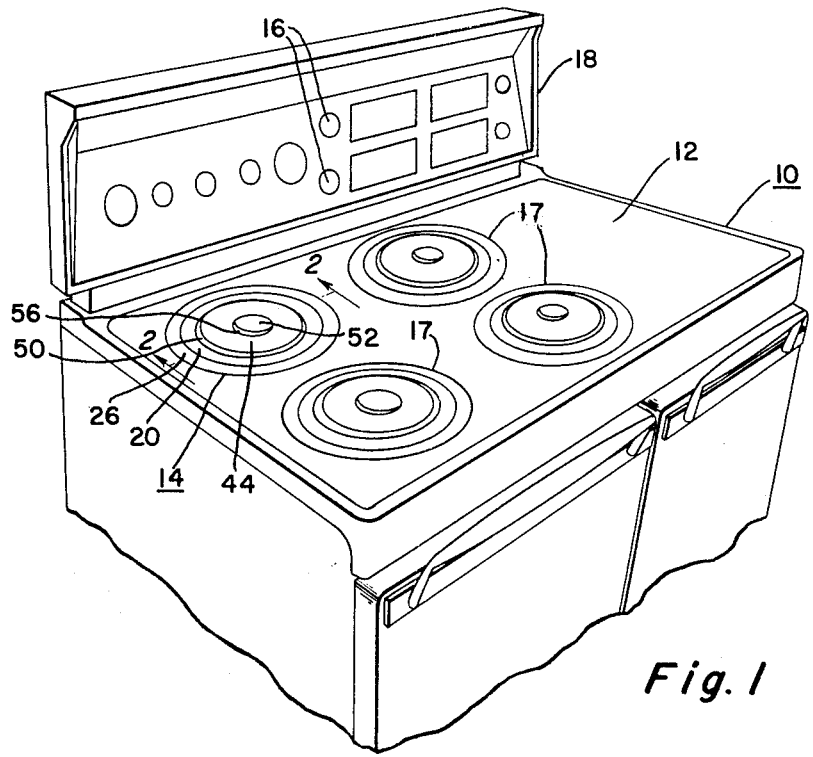
FIGURE 1 is a fragmentary perspective view of an electric range suitable for use with this invention.

In accordance with this invention and with reference to FIGURE 1, an electric range 10 is illustrated. The range 10 is provided with a range top 12 having a plurality of surface heaters or cooking units such as 14 on one side thereof. Suitable controls such as 16 are provided on a console 18 of the range and adapted for selectively energizing the surface cooking unit 14.

One of the disadvantages with prior art electrical sheathed heating elements has been their ability to retain heat after they are deenergized. This heat tends to continue the cooking operation beyond the proper end point. Such carry-over of heat tends to cause overcooking, boiling over and occasional scorching of the food being prepared. Further, the coiled tubular sheathed heating elements present a rather unstylish appearance on the range top. Such construction impedes the restyling of an electric range and prevents the range from having a bright clean exterior appearance in the area of the surface cooking unit.

FIGURE 1 depicts a novel air convection range surface heater or cooking unit 14 wherein a current of superheated air radially traverses the top of the surface cooking unit from the outer periphery to the center of the unit. In its flow the air will transfer its heat very evenly to any utensil placed thereon. The surface of the heating element 14 may be kept clean and bright because the cooking vessel contact area operates at a relatively low temperature permitting the use of special high temperature vitreous enamel as a coating for parts in this area. This enamel, more properly called a ceramic coating, remains bright and lustrous during operation and in the case of soiling can be cleaned easily by usual kitchen methods. Further, such enamel can be modified to match a wide variety of colors obtainable with convectional vitreous enamels. These possibilities enhance the styling possibilities with the surface cooking unit 14.

In prior art tubular sheath heaters, the tendency to overheat when the heating element is unloaded occurs from the fact that the air surrounding the sheath is static and resists dissipation of its heat in the area of the heating element, thereby overheating the enclosed resistance coil. The lower operating temperature of the range surface heater or cooking unit of this invention is in the neighborhood of 1100° F. and such relatively low temperature has been made possible by using the principle of convection heat flow rather than the prior art radiation-conduction which produces surface temperatures as high as 1550° F. In the cooking unit 14 of this invention, the convection heat transfer medium is air which is heated by a remotely located electric heating element and continuously recirculated by a fan or blower as described next following.

Figure 2:
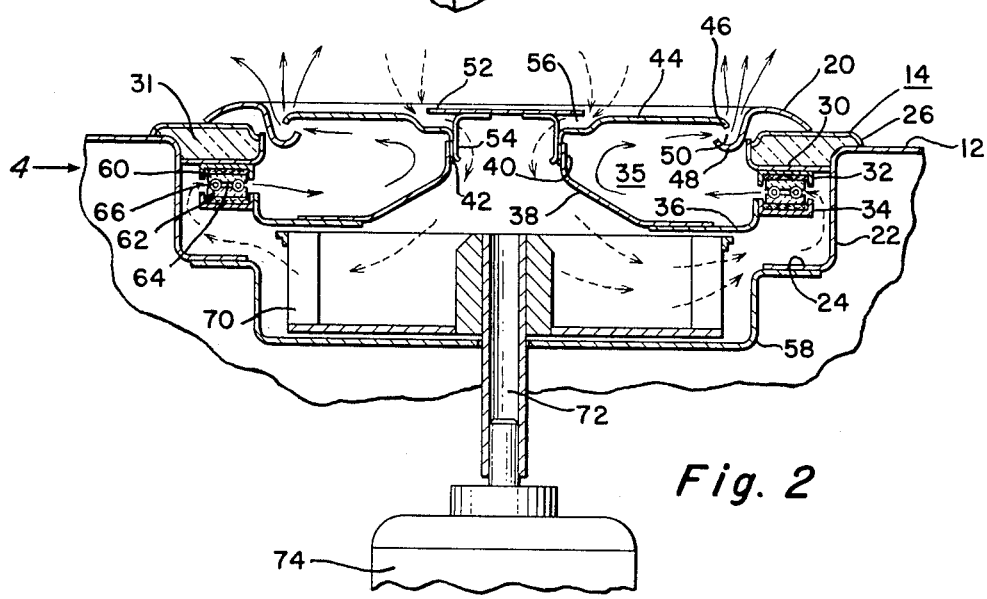
FIGURE 2 is a fragmentary section taken along line 2—2 in FIGURE 1 to show the air convection range surface heater in an unloaded condition.

With reference to FIGURE 2, a sectional view of the convection air surface heater or cooking unit of this invention is shown comprised of an annular pan support ring 20 which is located on the top surface 12 of the range. The range top 12 is formed with a cylindrical depending collar 22 which terminates in a horizontal shoulder 24. A trim ring 26 rests on the range top 12 and has connected thereto an upper heater support ring 30 to which is attached an upper heater support bracket 32. A ring of insulation 31 may be sandwiched beneath the trim ring 26 to minimize heat transfer at this point. Disposed in opposite relationship to the upper support bracket 32 is a lower heating element support bracket 34 fixed relative to the range top in any suitable fashion to form a plenum with said collar 22. An annular duct flange 36 is connected to the support bracket 34 and supports a generally conical return duct or exhaust passage 38.

The return duct 38 has an upwardly extending collar 40 which receives in nested relationship a down-turned collar 42 of a supply duct ring 44. Note that the supply duct ring 44 is spaced below the uppermost contact point of the pan support ring 20 and terminates at 46 in spaced relation to a down-turned flange 48 on the support ring 20, thereby forming an annular hot air supply outlet 50. A center baffle 52 may be provided with depending spring clips 54 which frictionally engage the collar 42 of the supply duct ring to space the baffle 52 from the ring 44 to form therewith a return air inlet opening 56. The air flow passages are completed by a fan housing 58 which is fastened in airtight relationship to the shoulder 24 of the range top 12.

A resistance coil 66 is held in a ceramic sandwich formed of an upper annular ceramic ring or support 60 and a lower annular ceramic ring or support 62. A heating passage or chamber 64 is formed between the ceramic supports to cradle the bare convolutions of the resistance coil 66 in a remote location circumscribing the surface heater 14 beneath the upper surface thereof. As best seen in FIGURES 4 and 5, the heating air passage or chamber 64 is shown to provide ample clearance for air flow over and around the resistance coils.

To initiate air circulation, an impeller 70 is disposed within the fan housing 58 and connected to a shaft 72 journaled in any suitable manner in the fan housing 28. A motor 74 sized to drive the impeller and suitable for installation in the range 10 may be used and concealed beneath the range top.

No difficulties have been experienced with overheating of the electric motor 74 as the result of surface unit operation. However, it should be understood that motor design and operation within higher ambient temperatures is a subject of variation well within the skill of a mechanic. It should also be understood that a single motor 74 could be used to drive impellers in the other air convection surface heaters such as 17—the motor being energized whenever any one of the surface heaters 14 or 17 is energized.

The external top plate hardware consisting of the trim ring 26, the pan support ring 20, the supply duct ring 44 and the center baffle 52 has been formed from austenitic stainless steel (Type 304). Such stainless steel was selected for its superior hot strength over carbon steel grades. However, it is quite possible that a lower grade alloy will have sufficient hot strength to meet the temperatures encountered in the air convection range surface heater of this invention.

Regarding a control system for the air convection unit, the control 16 has been designed with a flash overvoltage arrangement similar to that taught in the patent to Vogelsberg 2,666,124 issued January 12, 1954. In the instant application, the control switch 16 has been wired with a modified overvoltage period of eighty seconds. This extra power is required to offset the thermal mass of the fan housing 58 and other adjacent portions of the surface heater 14 and range top. It should be understood, however, that decreasing the mass of the parts of and around the surface cooking unit 14 will minimize the requirements for preheat. Suitable electrical controls may also be provided to effect a thermally activated safety switch which will prevent coil burn-out in case of air flow blockage. Likewise, an interlock switch may be provided to prevent switching to the flash heating voltage if the surface unit 14 is already at operating temperature.

Conditions encountered in the operation of the air convection range surface heater 14 are shown in FIGURE 2 for an unloaded condition and in FIGURE 3 for a loaded condition, wherein a utensil is resting on the surface unit.

Taking the unloaded condition first and referring now to FIGURE 2, it will be seen that the energization of the motor 74 and the electric resistance coil 66 will set up a flow of heated air. More particularly, cool room air (dashed arrows) will be drawn in between the center baffle 52 and the supply duct ring 44. The impeller 70 will force the air through the heating chamber 64 between the ceramic supports and around the open coils 66. Coming out of the open coil heater, the heated air will flow into the annular supply duct or supply air passage 35 and will be forced through the annular passageway 50 between the supply duct ring and the pan support ring 20. Note that the heated air is thrown outwardly from the surface of the unit 14. This nonrecirculating or nonregenerative system will prevent the heating coil 66 from being overheated and the life of the coil will be thus extended. Since the air flow rapidly dissipates the coil heat, high temperatures are avoided and severe oxidation or melting prevented—coil deterioration by flaking away is minimized.

Considering now the loaded condition of the surface unit 14, FIGURE 3 illustrates a recirculating air system. With the energization of the motor 74 and the heating coil 66 and with a pan 80 resting on the support ring 20, a closed air passage or air circulation space 82 will be formed between the bottom 84 of the pan and the supply duct ring or baffle plate means 44. Thus, air is forced by the impeller 70 through the open coil 66 and into the supply duct 35. From this supply duct, the heated air is forced through the duct outlet 50 into the distribution passage 82 along the bottom of the pan. There the heat is distributed evenly along the bottom of the pan, returning to the impeller through the return duct 38. The air will be continuously recirculated so long as the heating coil 66 is energized through the switch 16. With a cooking vessel present, recirculation of the same air prevents heat loss to the outside. Further, watt density of the coil 66 may be greater, i.e., more power may be supplied per given wire or coil size due to the rapid heat dissipation set up by the air flow.

Where the pan 80 has been removed from the energized surface heater 14, recirculation ceases and the air is exhausted to the surrounding atmosphere. This is a very desirable feature since it prevents overheating of the unit when no vessel is present. As aforementioned, this corrects one of the major problems of a sheathed tubular heater unit, i.e., no load overheating.

In view of the foregoing, it should now be seen that an improved surface heater has been devised for an electric range wherein air convection is used to transfer heat from a remote heating coil to the cooking area. In so doing, greater uniformity of heating with less tendency to burn or scorch is accomplished. This is particularly so in using utensils having poor conductivity, such as cast iron. The improved heater of this invention has little sensitivity to pan bottom flatness or contact geometry as compared with a tubular sheath unit. Of prime importance in the improved cooking unit of this invention is the fact that heat flow or output may be stopped substantially instantaneously when the heater-fan combination is deenergized, the resistance coil 66 being shielded by members 44 and 48 to prevent direct or straight line radiation to the pan bottom. This eliminates the problem of overcooking and spill-overs encountered when a conventional unit is deenergized without removing the cooking utensil. These and other advantages readily appreciated by one skilled in the art are all embodied in the air convection range surface heater of this invention.

While the embodiments of the present invention as herein disclosed, constitute preferred forms, it is to be understood that other forms might be adopted.

What is claimed is as follows:

1. A surface cooking unit for an electric range comprising an annular support ring defining a cooking plane at the top thereof for supporting a utensil on the top of said range, electrical heating means remote from said support ring and positioned in fixed relationship to said support ring in a manner to prevent any straight line radiation from said heating means to said cooking plane, means forming an annular supply air passage wholly internally of said cooking unit having a supply inlet adjacent one side of said heating means and a supply outlet adjacent said support ring, means forming a return air passage wholly internally of said cooking unit having a return inlet connected to said supply outlet by an open-sided chamber defined by said support ring and said cooking plane and a return outlet adjacent the other side of said heating means, and air impelling means in one of said passage means for recirculating air between said heating means and said support ring for heating said utensil solely by convection.

2. A surface cooking unit for an electric range having a range top opening defined by a depending annular shoulder, an annular trim ring carried by said range top and having an upper heater support ring, an annular pan support ring carried by said trim ring and having a depending flange, a lower heater support ring spaced from said upper heater support ring, said lower heater support ring fixed in spaced relation to said shoulder to form a return air plenum on one side of said support rings, an annular coiled heating element in sandwiched relation between said upper heater support ring and said lower heater support ring to form a heating chamber, a generally conical return duct carried by said lower heater support ring and having an upstanding cylindrical collar approximately in the geometric center of said cooking unit, a supply duct ring having a downwardly directed cylindrical collar in nested relationship with said return duct collar to form with said return duct an air passage to said return air plenum, said supply duct ring having an upper surface below the top of said pan support ring, a center baffle in slip-fitting spaced engagement with said depending collar of said supply duct ring to shield one end of said air passage, and air impelling means in said air passage energized simultaneously with said coiled heating element to circulate air sequentially through said heating chamber, between said supply duct ring and a plane coincidental with the top of said pan support ring, and between said center baffle and said downwardly directed collar of said supply duct ring to said air passage and said return air plenum for recirculation to said heating chamber, thereby to cook by convection currents of heated air.

3. A surface cooking unit for an electric range having a range top opening defined by a depending annular shoulder, an annular trim ring carried by said range top and having an upper heater support ring, an annular pan support ring carried by said trim ring and having a depending flange, a lower heater support ring spaced from said upper heater support ring, said lower heater support ring fixed in spaced relation to said shoulder to form an air plenum on one side of said support rings, an annular coiled heating element in sandwiched relation between said upper heater support ring and said lower heater support ring to form a heating chamber, a generally conical duct carried by said lower heater support ring and having an upstanding cylindrical collar approximately in the geometric center of said cooking unit, a supply duct ring having a downwardly directed cylindrical collar in nested relationship with said duct collar to form with said duct an exhaust air passage, said supply duct ring having an upper surface below the top of said pan support ring, and air impelling means energized with said coiled heating element to circulate air sequentially through said heating chamber and between said supply duct ring and a plane coincidental with the top of said pan support ring to said exhaust air passage, thereby to cook by convection currents of heated air.

4. A surface cooking unit for an electric range having a range top opening defined by a depending portion, a trim member carried by said range top and having an upper heater support, a pan support member carried by said trim member, a lower heater support spaced from said upper heater support, said lower heater support fixed in spaced relation to said range top depending portion to form an air plenum on one side of said heater supports, a heating element in sandwiched relation between said upper heater support and said lower heater support to form a heating chamber, a duct carried in fixed relation to said lower heater support and having a top opening approximately in the geometric center of said cooking unit, a supply duct member having an opening substantially concentric with said top opening in said duct to form with said duct an exhaust air passage, said supply duct member having an upper surface below the top of said pan support member, and air impelling means energized with said heating element to circulate air sequentially through said heating chamber and between said supply duct member and a plane coincidental with the top of said pan support member to said exhaust air passage, thereby to cook by convection currents of heated air.

5. A surface cooking unit for an electric range top means having a range top opening and an upper heater support, a pan support member carried by said range top means and surrounding said range top opening, a lower heater support spaced from said upper heater support, said lower heater support fixed in spaced relation to said range top means to form an air plenum on one side of said heater supports, a heating element supported between said upper heater support and said lower heater support to form a heating chamber, first duct means carried in fixed relation to said lower heater support and having a center opening approximately in the geometric center of said cooking unit, second duct means having an opening substantially concentric with said center opening in said first duct means and forming with said first duct means an exhaust air passage and a supply air passage, said second duct means having an upper surface below the top of said pan support member, and air impelling means energized with said heating element to circulate air sequentially through said heating chamber, said supply air passage and between said second duct means and a plane coincidental with the top of said pan support member to said exhaust air passage, thereby to cook by convection currents of heated air.

6. A surface cooking unit for an electric range comprising range top means having an opening therein, means in said opening for supporting a utensil on the range top, substantially planar baffle means spaced slightly below the plane of a utensil bottom supported on said supporting means to define a thin planar air circulation space in said range top means immediately below said utensil bottom, said air circulation space closable at least partially by a utensil supported thereon, electrical heating means remote from said air circulation space and positioned in fixed relationship to the supporting means in a manner to prevent straight line radiation from said heating means to said air circulation space, supply air passage means connecting one side of said heating means with said air circulation space and oriented with respect to said supporting means to direct air immediately against a utensil supported on said supporting means, return air passage means connecting said air circulation space with the other side of said heating means, and air impelling means in one of said passage means for circulating air between said heating means and said air circulation space for heating said utensil, said baffle plate means, said supply air passage means and said return air passage means having low thermal mass so that the heat output at said air circulation space will be substantially immediately responsive to the energization and deenergization of said heating means.

7. A surface cooking unit for an electric range comprising range top means having an opening therein, means in said opening for supporting a utensil on the range top, substantially planar baffle plate means spaced slightly below the plane of a utensil bottom supported on said supporting means to define a thin planar air circulation space in said range top means immediately below said utensil bottom, said air circulation space closable at least partially by a utensil supported thereon, electrical heating means remote from said air circulation space and positioned in fixed relationship to the supporting means in a manner to prevent straight line radiation from said heating means to said air circulation space, sheet material supply air passage means connecting one side of said heating means with said air circulation space and oriented with respect to said supporting means to direct air immediately against a utensil supported on said supporting means, sheet material return air passage means connecting said air circulation space with the other side of said heating means, and air impelling means in one of said passage means for circulating air between said heating means and said air circulation space for heating said utensil, one of said air passage means having an opening in communication with said air circulation space substantially along an inner portion of said cooking unit, the other of said air passage means having an opening in communication with said air circulation space substantially along an outer portion of said cooking unit, said openings being in a common plane thereby to provide for a thin horizontal air flow between said openings along said air circulation space, said baffle plate means, said supply air passage means and said return air passage means having low thermal mass so that the heat output at said air circulation space will be substantially immediately responsive to the energization and deenergization of said heating means.

8. The surface cooking unit of claim 7 wherein the supporting means and the openings in said air passage means are annular and concentric thereby to provide for a horizontal air flow which is radial.

References Cited in the file of this patent
UNITED STATES PATENTS

| | | |
|---|---|---|
| 1,758,474 | Seehaus | May 13, 1930 |
| 2,164,265 | Wilson | June 27, 1939 |
| 2,239,957 | Genda | Apr. 29, 1941 |
| 2,453,425 | Freed | Nov. 9, 1948 |
| 2,579,898 | Brucker | Dec. 25, 1951 |
| 2,909,636 | Chambers | Oct. 20, 1959 |

FOREIGN PATENTS

| | | |
|---|---|---|
| 341,788 | Great Britain | Jan. 22, 1931 |